United States Patent [19]
Garcia

[11] Patent Number: 5,257,831
[45] Date of Patent: Nov. 2, 1993

[54] RAG TEARING MACHINES FOR THE TEXTILE INDUSTRY

[76] Inventor: Francisco M. Garcia, Plaza Valles No. 44, 10-1a, 08201 Sabadell (Barcelona), Spain

[21] Appl. No.: 842,063

[22] Filed: Feb. 26, 1992

[30] Foreign Application Priority Data

Feb. 27, 1991 [ES] Spain .................................. 9100506

[51] Int. Cl.$^5$ .............................................. B02C 19/12
[52] U.S. Cl. ........................................ 241/42; 241/61; 241/76; 241/79; 241/101.2; 241/152.1; 19/82; 209/21; 209/138
[58] Field of Search ................... 241/47, 60, 61, 154, 241/DIG. 38, 101.2, 101.4, 152.1, 41, 42, 43, 62, 69, 76, 79; 19/57, 82, 107, 204, 205; 209/21, 138

[56] References Cited

U.S. PATENT DOCUMENTS

| | | | |
|---|---|---|---|
| 1,825,168 | 9/1931 | Wilkinson | 19/204 |
| 1,942,868 | 1/1934 | Mitchell | 19/204 X |
| 3,633,831 | 1/1972 | Dodson et al. | 241/61 |
| 3,987,968 | 10/1976 | Moore et al. | 241/154 X |
| 4,240,182 | 12/1980 | Leifeld et al. | 241/60 X |
| 4,244,082 | 1/1981 | Leifeld et al. | 241/60 X |
| 4,365,389 | 12/1982 | Beneke et al. | 19/205 X |
| 4,623,515 | 11/1986 | Frei et al. | 241/DIG. 38 X |
| 5,031,844 | 7/1991 | LaRoche et al. | 241/280 X |

FOREIGN PATENT DOCUMENTS

239954  10/1986  Fed. Rep. of Germany ... 241/DIG. 38

*Primary Examiner*—Douglas D. Watts
*Assistant Examiner*—Clark F. Dexter
*Attorney, Agent, or Firm*—McGlew and Tuttle

[57] ABSTRACT

The rag tearing machine embodies an inlet station 1 in which the materials to be processed for a first time 23 and recycled waste 19 are poured, separately, onto the circulating belt 2. Several rag tearing stations (4a, 4b) are each followed by fan groups (5a, 5b), including side doors 8 access for which throw a material coming from the preceding station to a filtering box 9 in which powder, after a sharp bend 10 separates from the material by passing through a pierced plate 11; the material then falls down and passes to the following station and so on until the end of the machine. The machine further includes gates 14 for bypassing subsequent stations and if the material is considered sufficiently processed, the respective gate is opened and the material goes out of the machine through a duct 15.

9 Claims, 3 Drawing Sheets

RAG TEARING MACHINES FOR THE TEXTILE INDUSTRY

FIELD OF THE INVENTION

This invention relates to improvements to rag tearing machines used in the textile industry. Significant advantages of practical and economic feature are achieved, namely on similar existing machines as it will be disclosed below.

BACKGROUND OF THE INVENTION

Machines of this type are known since a long time ago. The Spanish Introduction Patent 322,339, for example, disclosed a machine for opening and tearing textile materials which basically includes a supply system which conveys the textile products or waste through any number of rag tearing units mounted in series. Each of the units being composed of a rag tearing drum or cylinder provided with pins in front of which the products were carried by a rotating roll in front of a conveyor. After each drum, the products are collected on a plate and sucked through a pierced and rotating metallic drum which is depressed thanks to a sucking fan, which acts as filter. At the bottom of the machine there is a conveyor belt which recirculates the rags or threads not torn toward the initial supply system.

Anyway, this type and other existing machines more or less based on same principle, are produced in modular form. That means that the lap of fibers moves through several modules. Each of these modules being provided with a rag tearing drum with mentioned fittings and elements, constituting several steps or stations. In some machines, the number of the stations is two or three. In other machines there are even six. The material sustains the process of all of them until the material is collected at the outlet of the final drum.

In fact, in accordance with the type and nature of the material, the process should not necessarily include a high number of drums, for example six, but that sometimes with less drums it is enough to obtain a satisfactory result. This, therefore, makes it necessary to have available several types of machines with one, two, three and even more drums, respectively, to work with the different types of more or less coarse material. The significant economic investment is clear.

SUMMARY AND OBJECTS OF THE PRESENT INVENTION

These improvements are channeled first toward achieving the same effect for all kinds of material using a single machine. This single machine has movable elements or gates between each drum and the following, allowing optionally the outlet of the material processed and sufficiently defibered without having it passing through all the drums until reaching the last one. This means a very significant saving as it is not necessary to purchase as many machines as there are different numbers of drums or rag tearing stations and not having to uselessly operate modules or stations.

On the other hand, the machines known have available, in general, a single powder or dust sucking device at the material inlet to remove dirt. The improvements of the present invention provide a loading system between each drum that includes, at the outlet of each sucking device, a duct with one of its faces having a grating. This favors the powder being expelled into the grating. The powder remaining suspended and improving the filtering between a station and the following in the machines are known.

The transfer of the material from a drum or station to the immediately following station is achieved by centrifugal fans. This allows to best apportion the material to be treated in the following station throughout the width of the following machine. Other known machines carry one or several fans always forming a depression by means of a pierced cylinder or similar elements for the passing of the material from one station to the following. The depression is achieved on the sides of the very machine, and therefore the side of the machine is working more than the rest of the width thereof, to the detriment of an even apportionment of the material.

In addition, a novel access of the fans is provided. This access consisting of an opening in one of its lateral inlets in order to clean the turbine and its interior without having to disassemble them.

The material processed at each step or station of the machine is directly shifted toward the final outlet, and should it be necessary, is subjected to all the steps, one by one as described. In the event the waste material was not correctly processed, it is drained and falls down a pneumatic carrying duct that conveys it to the inlet of the very machine to be recirculated. We must point out, in the machine according to these improvements, that the inlet is divided into two ducts: one for the waste which has been drained and which are poured on the inlet apron and another duct which conveys the new material to be defibered which is poured on top of the waste on the inlet apron. Having the new material to be defibered on top of the drained material, causes the drained material to be best retained by the inlet device when being defibered.

These and other characteristics will be best understood by means of the following description to which three sheets of drawing are attached in which is shown a practical case of embodiment which is mentioned for example purpose, not limitative, of the scope of this patent of invention.

DETAILED DESCRIPTION OF THE PREFERRED EMBODIMENT

Figure 1:
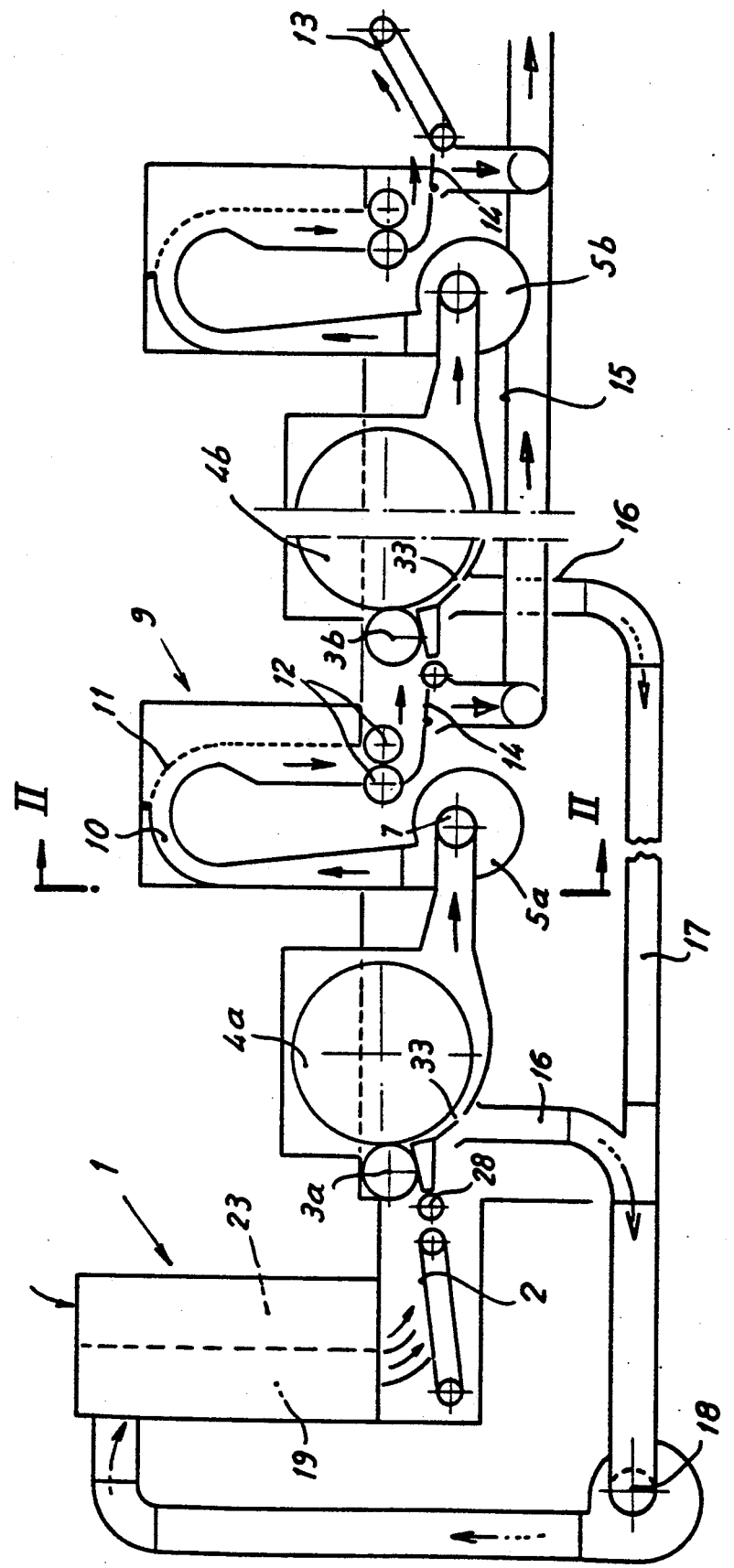
FIG. 1 shows a general view of the machine or object of these improvements.
Figure 2:
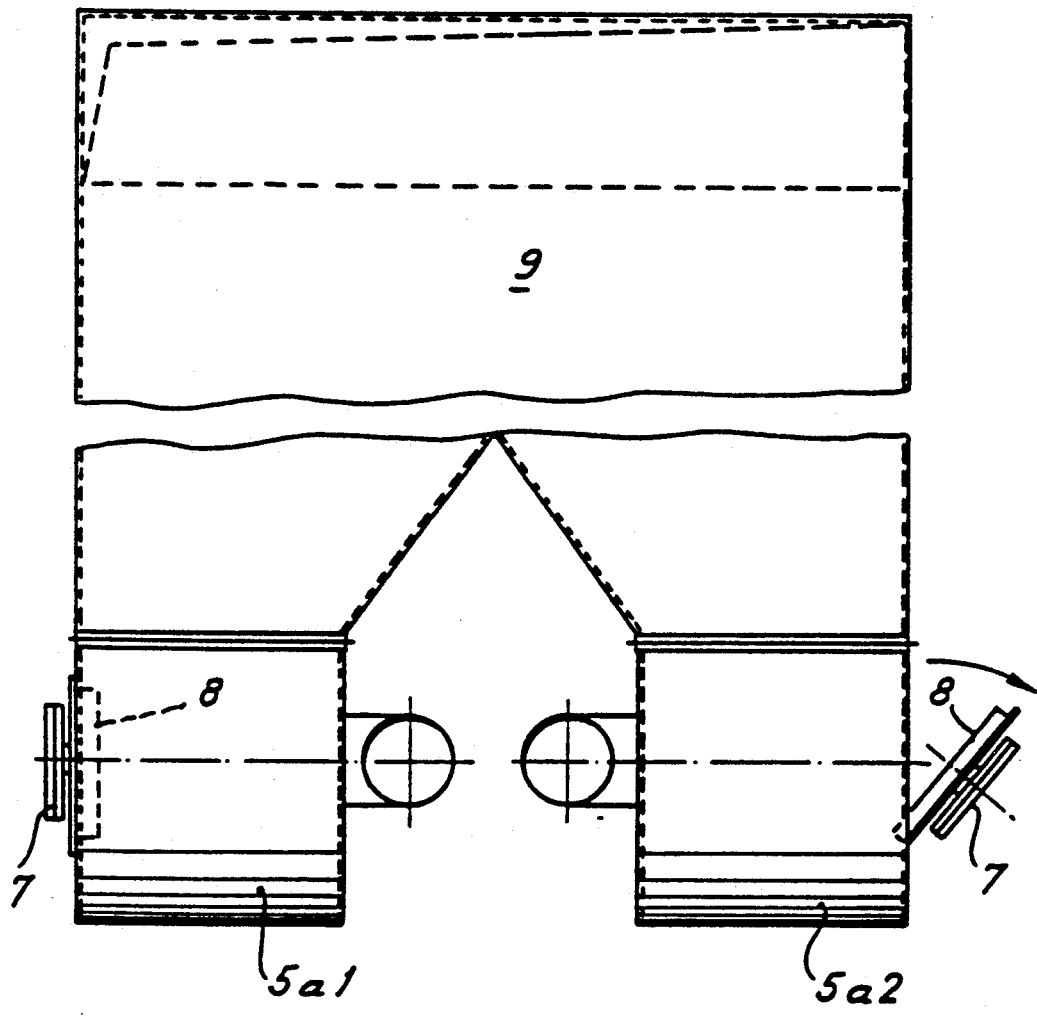
FIG. 2 shows a cross section according to the section plane II—II.

According to the figures, the machine or subject matter of these improvements embodies a loader 1 of waste to be torn and which ends on a circulating belt 2. This circulating belt 2 conveys the waste toward the cylinder 3a which introduces it to the nail or similar drum 4a. At an outlet of drum 4a, the defibered material is sucked by the centrifugal fans 5a for its transfer to the following step or station 4b. The use of two fans 5a1 and 5a2 instead of only one, allows a more even suction of the material throughout the width of the machine from the preceding station 4a and a more even throwing of it throughout the width of and to the following station 4b.

It must be noted that to gain access and clean the interior of the fans 5a, two sides 7, are lowerable, as doors 8.

Between one station 4a and the following station 4b, and after the fans 5a, a separating box means 9 is positioned. Through this box 9 the material, which is partly processed, is risingly thrown uprightly, and on top of box 9 there is a duct 10 which is bent about 180 degrees to return the material vertically downward. The second half of the bend, as well as a wall of the downward slope of the duct, have a pierced or perforated section 11. The dirt in the form of powder or dust that the material contains, is forced to pass through those holes or perforations due to the centrifugal impulsion force granted by the fans 5a. The material then falls down, passes between the rolls 12 and cylinder 3b and reaches the large drum 4b. The process is repeated until the last step or station 4b where the material is conveyed to its proper place by belt 13. This way, then, the material will have passed through all the stations of the machine 4a, 4b.

However, it may occur that due to the nature of the waste, it will be only necessary to process the material at one or several stations, not in all of them. In this case, gates 14 have been provided between one station and the following. After the filtering 11, opening the gate 14 causes the material which is sufficiently processed to fall down a conveyor system 15 for example pneumatic, which conveys it directly out of the machine.

The operation of the gates 14 will be carried out at the discretion of the operator by means of the best fitted elements: mechanic, electric, pneumatic, hydraulic, etc. not shown.

Under each drum 4, there is a section 33 where the waste is divided in two parts.

One of the two parts is a first part of the material which is still to be treated in the subsequent stations of the machine or which goes directly outside through a gate 14 because it is already sufficiently processed. The second part is recycled waste which falls down by a respective branch circuit 16 toward collector 17 which, thanks to suction produced by fan 18, conveys the recycled waste to a first hopper 19 of the machine for its recirculation.

The dividing of the waste in section 33 is caused by the centrifugal force of the drum 4. Heavy elements such as buttons, rubbers, etc. fall down and go out from section 33 into the duct or branch circuit 16. This second part of the waste is then conveyed back to the machine for recycling. Lighter materials go onto following modules, or directly to the end of the process through gates 14.

Figure 3:
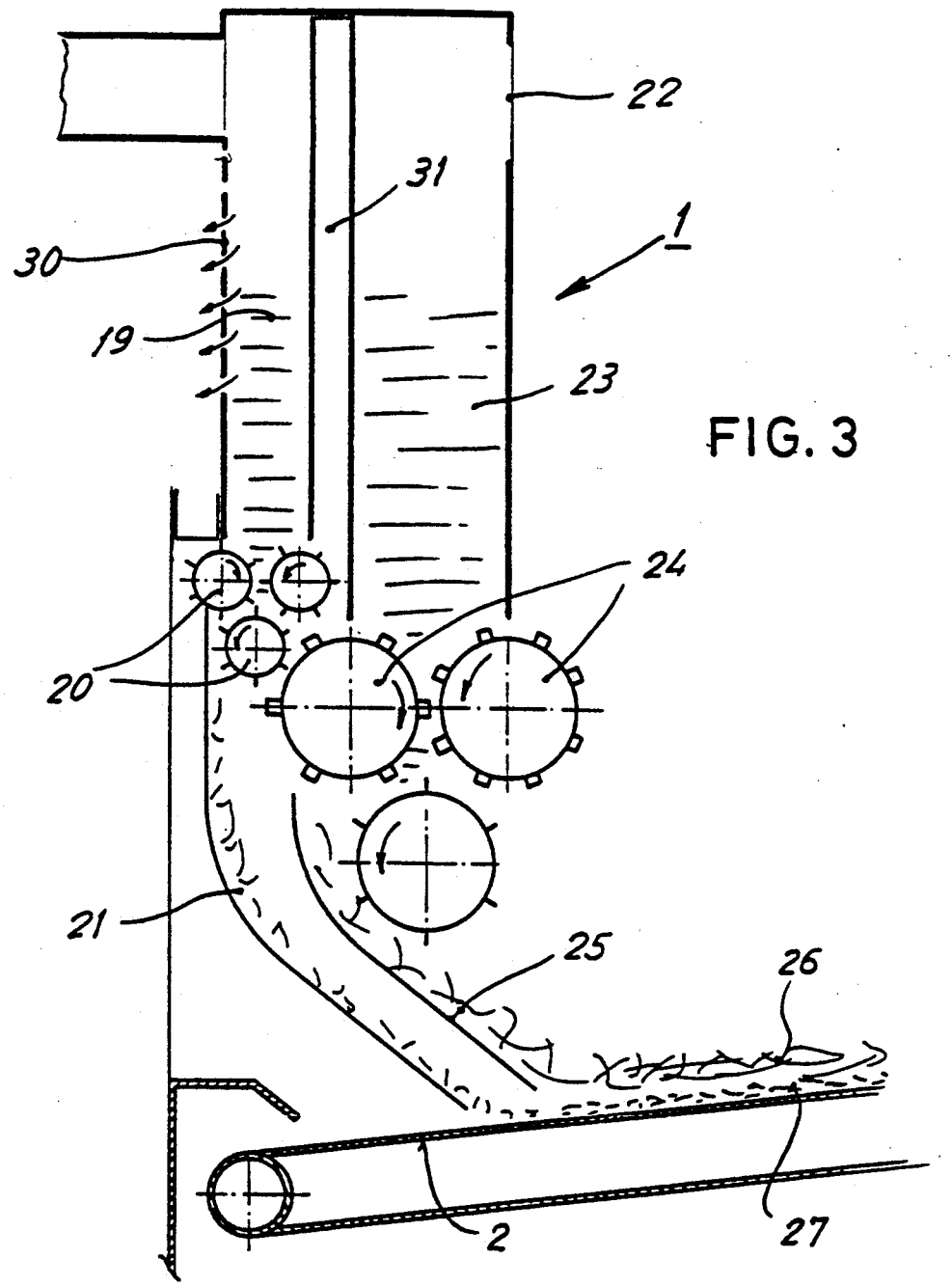
FIG. 3 shows a detail of the material entering the same machine.
Figure 4:
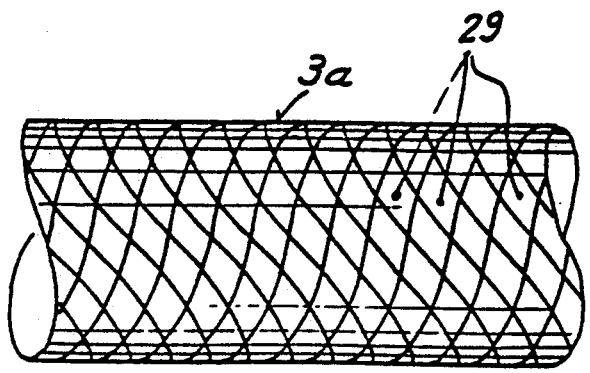
FIG. 4 is a detail of a grooved cylinder.

Note (FIG. 3) that the waste falls down through the first hopper 19, through the rolls 20 and chute 21 where it has access to the apron or belt means 2 for transporting the waste.

The "new" waste, on the contrary, is poured through the opening 22. It falls through the other or second hopper 23 and through the rolls 24. It then slides on another chute 25 falling finally down on the layer of waste forming two layers: a higher layer of new material to be treated 26 and a lower layer of recirculated waste 27. Both will be conveyed to the first large drum 4a by passing the roll 28 as they are being delivered to the roll 3a with helicoidal grooves in two directions, forming rhombuses 29. This initial arrangement in two layers, it was checked, operates more correctly because the recycled waste has better retention to the belt.

Conventionally, the inlet module or loader 1 of the machine embodies a multipierced wall 30 for respiration or aeration of the very module 1 and a vibrating wall 31 as a shutting post, to make the material fall down easily. This is already known in other machines manufactured by the firms RIETER or MARZOLI.

Each station of this machine is individual with respect to the others, that means it can be easily disassembled or taken apart.

While specific embodiments of the invention have been shown and described in detail to illustrate the application of the principles of the invention, it will be understood that the invention may be embodied otherwise without departing from such principles.

I claim:

1. A tearing machine comprising:
   belt means for transporting waste;
   a loader including first hopper means for receiving and guiding recycled waste onto said belt means, said loader also including second hopper means for receiving and guiding new waste onto said belt means;
   tearing drum means for receiving and tearing the waste from said belt means, said tearing drum means processing the waste into first and second parts, said first part of said waste being in a condition selected from a group consisting of a final condition and a subsequent processing condition, said second part of said waste being the recycled waste;
   collector means for transporting the recycled waste from said tearing drum means to said first hopper means;
   fan means for removing the first part of the waste from said tearing drum means;
   separating box means for receiving the first part of the waste from said fan means and separating powder-like material from the first part of the waste; and
   gate means for receiving the first part of the waste from said separating box means and operatable to direct the first part in one of a plurality of predetermined paths such that the waste in said subsequent processing condition is directed in a first path and waste in said final condition is directed in a second path.

2. A machine in accordance with claim 1, wherein:
   said second hopper means guides the new waste onto said belt means downstream of where said first hopper guides the recycled waste onto said belt means so that the new waste is on top of the recycled waste on said belt means.

3. A machine in accordance with claim 1, wherein:
   said first hopper means includes a chute with an opening at an end of said chute, said opening being adjacent said belt means, said first hopper means also including roll means for delivering the recycled waste onto said belt means.

4. A machine in accordance with claim 1, wherein:
   said second hopper means includes a chute with an opening at an end of said chute, said opening being adjacent said belt means, said second hopper means also including roll means for delivering the new waste onto said belt means.

5. A machine in accordance with claim 1, wherein:
   said fan means includes a plurality of fans aligned substantially in parallel.

6. A machine in accordance with claim 1, further comprising:
another tearing drum means for receiving and tearing waste from said first path of said gate means, said another tearing drum means processing the waste into first and second parts, said first part of said waste being in a condition selected from a second group consisting of a final condition and a subsequent processing condition, said second part of said waste being additional recycled waste;
said collector means transporting the additional recycled waste from said another tearing drum means to said first hopper means;
another fan means for removing the first part of the waste from said another tearing drum means;
another separating box means for receiving the first part of the waste from said another fan means and separating powder-like material from the first part of the waste of said another fan means;
another gate means for receiving the first part of the waste from said another separating box means and operatable to direct the first part in one of a plurality of predetermined paths such that the waste in said subsequent processing condition is directed in a first path and waste in said final condition is directed in a second path;
said second path of said another gate means directing said waste in said final condition to bypass said another tearing drum means.

7. A tearing machine comprising:
belt means for transporting waste;
a loader including first hopper means for receiving and guiding recycled waste onto said belt means, said loader also including second hopper means for receiving and guiding new waste onto said belt means;
tearing drum means for receiving and tearing the waste from said belt means, said tearing drum means processing the waste into first and second parts, said first part of said waste being in a condition selected from a group consisting of a final condition and a subsequent processing condition, said second part of said waste being the recycled waste;
collector means for transporting the recycled waste from said tearing drum means to said first hopper means;
fan means for removing the first part of the waste from said tearing drum means;
separating box means for receiving the first part of the waste from said fan means and separating powder-like material from the first part of the waste, said separating box means includes a duct having a section bent substantially 180 degrees, wherein a downstream radial outside half of said bent section of said duct and a portion of said duct adjacent and downstream of said bent section, including perforations; and
gate means for receiving the first part of the waste from said separating box means and operatable to direct the first part in one of a plurality of predetermined paths such that the waste in said subsequent processing condition is directed in a first path and waste in said final condition is directed in a second path.

8. A machine in accordance with claim 7, wherein:
said duct has two substantially vertical parts connected by said substantially 180 degree section, and said substantially 180 degree section is above said two substantially vertical parts.

9. A tearing machine comprising:
belt means for transporting waste;
a loader including first hopper means for receiving and guiding recycled waste onto said belt means, said loader also including second hopper means for receiving and guiding new waste onto said belt means;
tearing drum means for receiving and tearing the waste from said belt means, said tearing drum means processing the waste into first and second parts, said first part of said waste being in a condition selected from a group consisting of a final condition and a subsequent processing condition, said second part of said waste being the recycled waste;
collector means for transporting the recycled waste from said tearing drum means to said first hopper means;
fan means for removing the first part of the waste from said tearing drum means, said fan means including at least one lateral access door;
separating box means for receiving the first part of the waste from said fan means and separating powder-like material from the first part of the waste; and
gate means for receiving the first part of the waste from said separating box means and operatable to direct the first part in one of a plurality of predetermined paths such that the waste in said subsequent processing condition is directed in a first path and waste in said final condition is directed in a second path.

* * * * *

UNITED STATES PATENT AND TRADEMARK OFFICE
CERTIFICATE OF CORRECTION

PATENT NO. : 5,257,831
DATED : November 2, 1993
INVENTOR(S) : Francisco Marlasca Garcia It is certified that error appears in the above-identified patent and that said Letters Patent is hereby corrected as shown below:

On the title page, Item [76] Inventor should read as follows:

[76] Inventor: Francisco Marlasca Garcia,
Plaza Valles No. 44, 10-1a
08201 Sabadell (Barcelona),
Spain.

Item [19] "Garcia" should read --Marlasca Garcia--

Signed and Sealed this

Twelfth Day of April, 1994

Attest:

BRUCE LEHMAN

Attesting Officer    Commissioner of Patents and Trademarks